United States Patent
James

(10) Patent No.: US 10,577,572 B2
(45) Date of Patent: Mar. 3, 2020

(54) METHOD OF FORMING DECORATIVE SOAPS

(71) Applicant: Donna James, Seffner, FL (US)

(72) Inventor: Donna James, Seffner, FL (US)

( * ) Notice: Subject to any disclaimer, the term of this patent is extended or adjusted under 35 U.S.C. 154(b) by 258 days.

(21) Appl. No.: 15/710,920

(22) Filed: Sep. 21, 2017

(65) Prior Publication Data

US 2019/0085272 A1 Mar. 21, 2019

(51) Int. Cl.
| | |
|---|---|
| *C11D 13/16* | (2006.01) |
| *C11D 17/00* | (2006.01) |
| *B29C 33/42* | (2006.01) |
| *B29C 33/02* | (2006.01) |

(52) U.S. Cl.
CPC .............. *C11D 13/16* (2013.01); *B29C 33/02* (2013.01); *B29C 33/42* (2013.01); *C11D 17/0047* (2013.01)

(58) Field of Classification Search
CPC ...................................................... C11D 13/16
See application file for complete search history.

(56) References Cited

U.S. PATENT DOCUMENTS

| | | | |
|---|---|---|---|
| 4,030,867 A | 6/1977 | Everman | |
| 4,296,064 A | 10/1981 | Satcher | |
| 4,917,589 A | 4/1990 | Manderson | |
| 5,876,769 A | 3/1999 | Dowden et al. | |
| D411,212 S | 6/1999 | Jones | |
| 5,968,390 A | 10/1999 | Lister | |
| 6,184,500 B1 * | 2/2001 | Glucksman | ............ A61H 33/04 219/430 |
| 8,529,239 B1 | 9/2013 | Black, Jr. | |
| D759,782 S | 6/2016 | Short | |
| 9,631,166 B1 * | 4/2017 | Wallace | ................. C11D 13/16 |
| 2001/0044394 A1 * | 11/2001 | Hagen | ................. C11D 3/2065 510/141 |
| 2008/0196595 A1 * | 8/2008 | Krishnan | ............ A47J 37/0611 99/378 |
| 2011/0127245 A1 | 6/2011 | Burrrus | |
| 2015/0216368 A1 * | 8/2015 | McClendon | ........... C11D 13/16 222/1 |
| 2017/0015957 A1 * | 1/2017 | Jones | ..................... C11D 13/16 |

* cited by examiner

*Primary Examiner* — Robert B Davis

(57) ABSTRACT

A method of molding soap for forming decorative shapes includes a housing that has a top surface, a bottom surface and a perimeter wall that is attached to and extends between the top surface and the bottom surface. A heating unit is mounted in the housing. When turned on the heating unit heats the top surface. A plurality of molds, each has a different shape. One of the molds is selected to define a selected mold. The selected mold is positioned on the top surface such that the selected mold is in thermal communication with the heating unit. A bar soap is positioned in the selected mold. The heating unit is turned on such that the bar soap melts to define fluid soap. The heating unit is turned off to allow the fluid soap to solidify to define a molded soap. The molded soap is removed from the selected mold.

5 Claims, 4 Drawing Sheets

METHOD OF FORMING DECORATIVE SOAPS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to methods of molding soap and more particularly pertains to a new method of molding soaps into decorative shapes.

BRIEF SUMMARY OF THE INVENTION

An embodiment of the disclosure meets the needs presented above by generally providing a housing that has a top surface, a bottom surface and a perimeter wall that is attached to and extends between the top surface and the bottom surface. A heating unit is mounted in the housing. The heating unit heats the top surface when the heating unit is turned on. A plurality of molds is provided and each of the molds has a different shape. One of the molds is selected to define a selected mold. The selected mold is positioned on the top surface such that the selected mold is in thermal communication with the heating unit. A bar soap is positioned in the selected mold. The heating unit is turned on such that the bar soap becomes fluid to define fluid soap. The heating unit is turned off to allow the fluid soap to solidify to define a molded soap. The molded soap is removed from the selected mold.

There has been thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
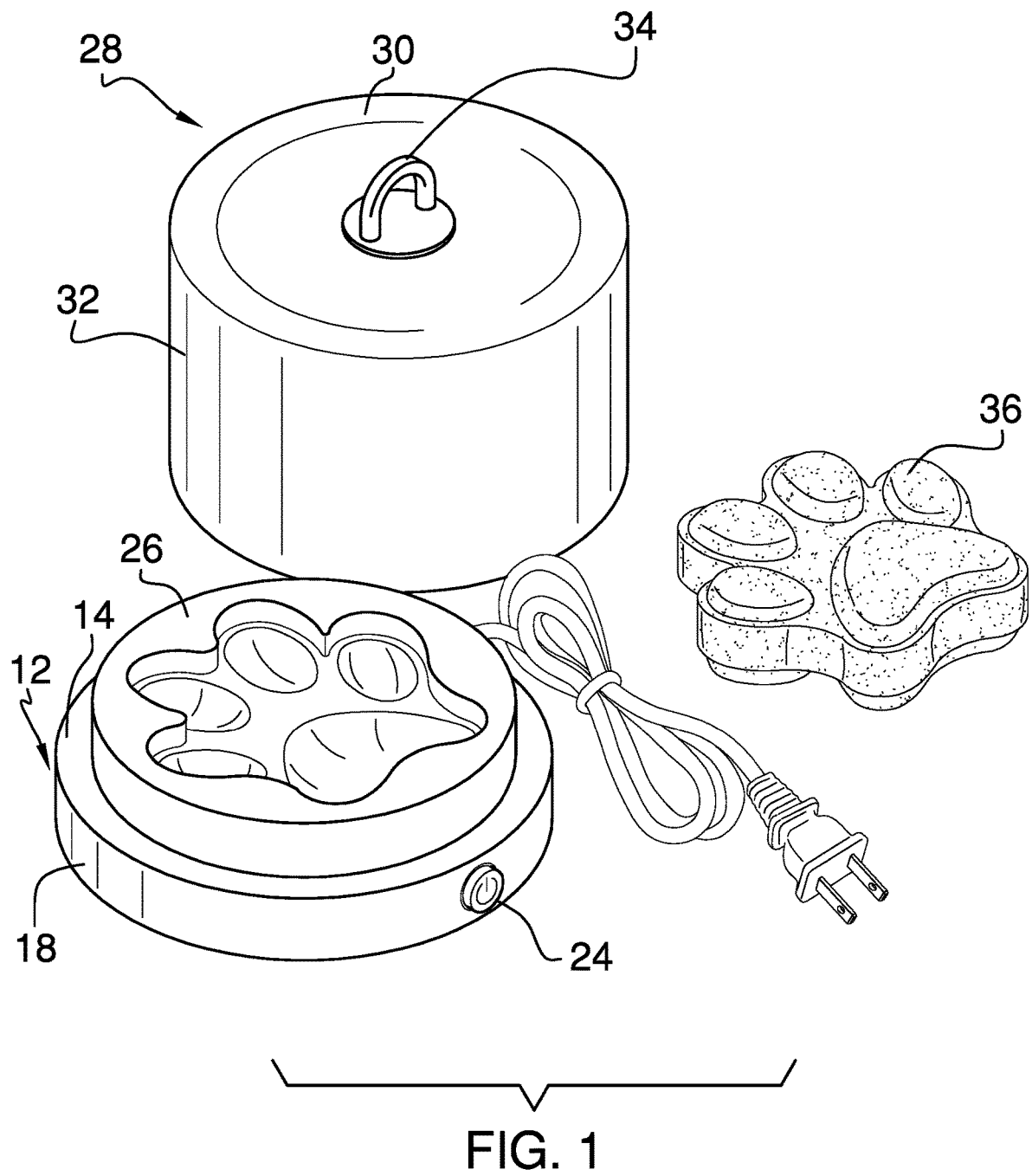
FIG. 1 is a perspective view of components of a method of forming decorative soaps according to an embodiment of the disclosure.
Figure 2:
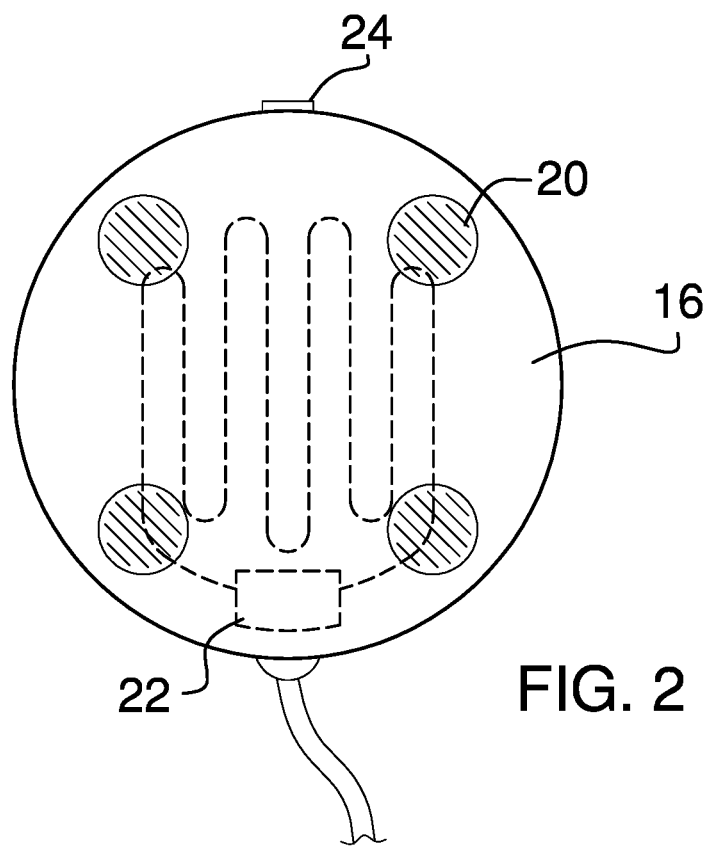
FIG. 2 is a back view of an embodiment of the disclosure.
Figure 3:
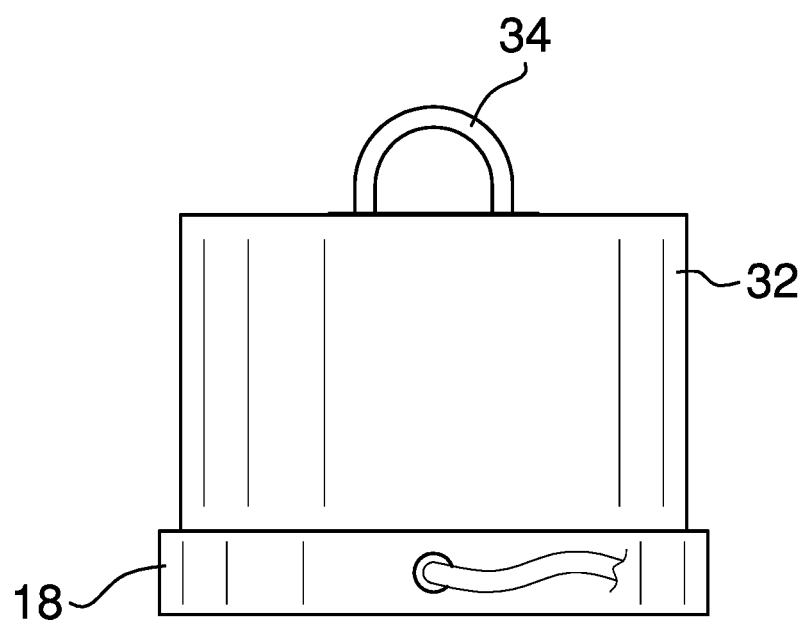
FIG. 3 is a back view of an embodiment of the disclosure.
Figure 4:
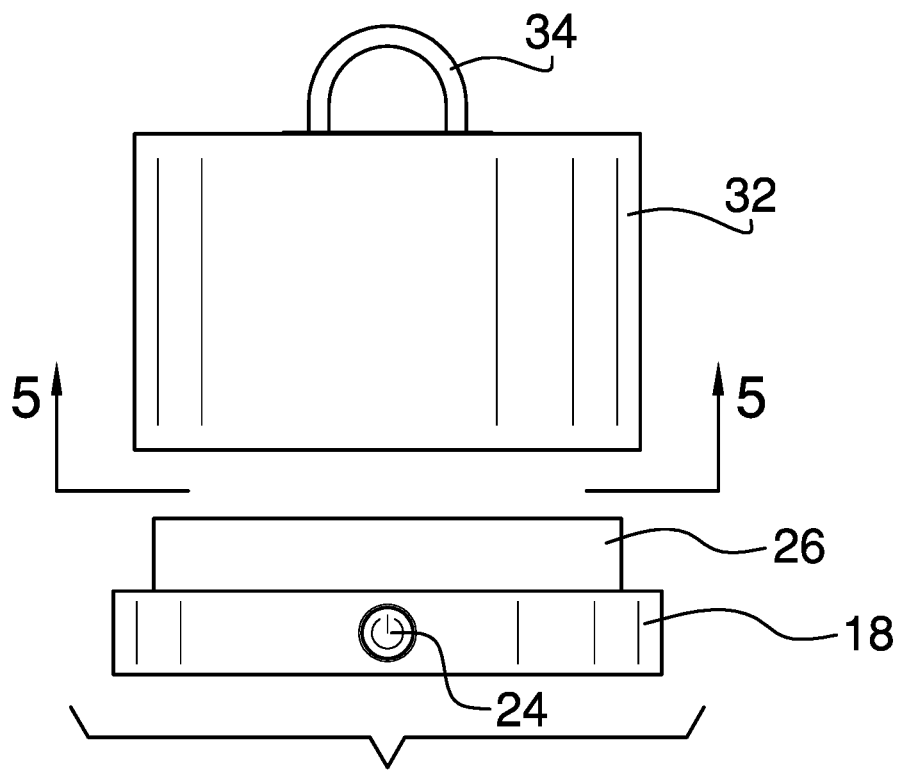
FIG. 4 is a front view of an embodiment of the disclosure.
Figure 5:
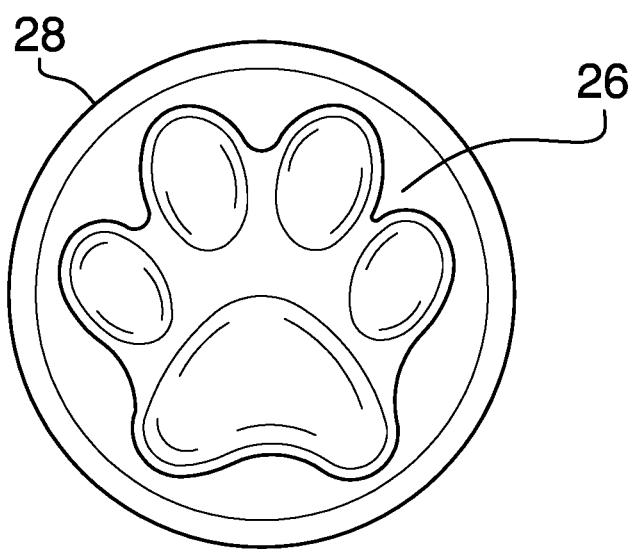
FIG. 5 is a bottom view of an embodiment of the disclosure taken along line 5-5 of FIG. 2.
Figure 6:
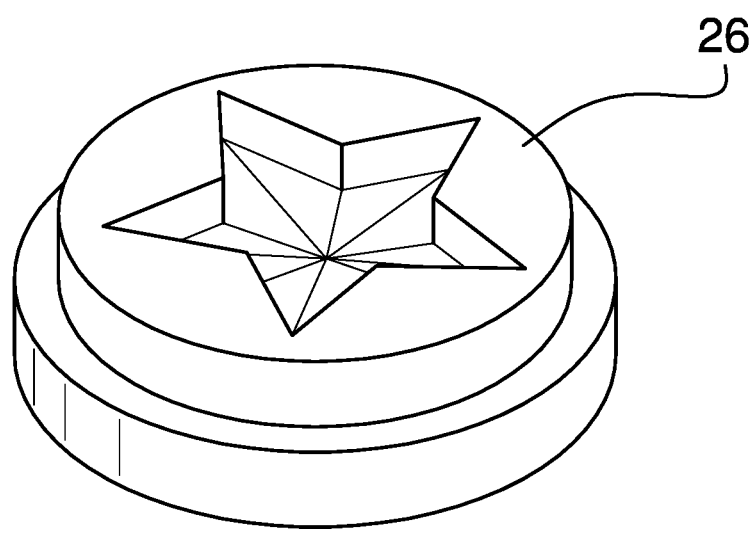
FIG. 6 is a perspective view of an alternative mold for use in an embodiment of the disclosure.

With reference now to the drawings, and in particular to FIGS. 1 through 6 thereof, a new methods of molding soap embodying the principles and concepts of an embodiment of the disclosure and generally designated by the reference numeral 10 will be described.

As best illustrated in FIGS. 1 through 6, the method of forming decorative soaps 10 generally includes providing a housing 12 has a top surface 14, a bottom surface 16 and a perimeter wall 18 is attached to and extends between the top surface 14 and the bottom surface 16. A plurality of feet 20 is attached to and extends downwardly from the bottom surface 16. Each of the feet 20 is comprised of an elastomeric material to increase friction between the feet and a surface such that said housing 12 does not slide across a surface it is positioned on. A heating unit 22 is mounted in the housing 12. The heating unit 22 heats the top surface 14 when the heating unit 22 is turned on. The heating unit may comprise any conventional heating element (heating coils) that will heat the top surface to a temperature generally of between 120° F. and 140° F. A power switch 24 is operationally coupled to the heating unit 22 and alternatingly turns the heating unit 22 on or off when actuated.

A plurality of molds 26 is provided and each of the molds 26 has a different shape. The shapes may include but should not be limited to animal paw prints, animals, letters, flowers and other decorative shapes. One of the molds 26 is selected to define a selected mold. The selected mold is positioned on the top surface 14 such that the selected mold is in thermal communication with the heating unit 22. A bar soap is positioned in the selected mold. The bar soap may comprise a full bar of soap, shavings or cuttings from bars of soaps or remnants of a bars of soap and should be understood as any bar of soap that fits within the mold.

A cover 28 is positioned on the housing 12 and removably covers the selected mold. The cover 28 includes a top wall 30 and a peripheral wall 32 is attached to and extends downwardly from the top wall 30. A handle 34 is mounted on the top wall. The heating unit 22 is turned on such that the bar soap becomes fluid to define fluid soap. A coloring agent may be added and mixed into the fluid soap, and may comprise a food coloring or the like particularly if the end product will simply be for decorative usage and not to be used for bathing. The heating unit 22 is turned off to allow the fluid soap to solidify to define a molded soap 36. The molded soap 36 is removed from the selected mold.

In use, the method is used to mold bar soap into a decorative shape. One of the plurality of molds 26 is selected. The selected mold is placed on the top surface 14. The bar soap is placed in the mold 26 and the cover 28 is positioned over the mold 26. The power switch 24 is turned on and the bar soap melts into fluid soap. The user may remove the cover 28, add coloring agent to the liquid soap and mix the coloring agent therein. The cover 28 is replaced and the power switch 24 is turned off to allow the bar soap to cool to define the molded soap 36. Once cooled the molded soap 36 is removed and used conventionally as bar soap.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of molding soap into a recognizable shape, said method comprising:
    providing a housing having a top surface, a bottom surface and a perimeter wall being attached to and extending between said top surface and said bottom surface, a heating unit being mounted in said housing, said heating unit heating said top surface when said heating unit is turned on;
    providing a plurality of molds, each of said molds having a different shape;
    selecting one of said molds to define a selected mold;
    positioning said selected mold on said top surface such that said selected mold is in thermal communication with said heating unit;
    positioning bar soap in said selected mold;
    turning on said heating unit such that said bar soap becomes fluid to define fluid soap;
    turning off said heating unit and allowing said fluid soap to solidify to define a molded soap;
    removing said molded soap from said selected mold;
    positioning a cover on said housing after placing said bar soap in said mold and covering said selected mold, said cover including a top wall and a peripheral wall being attached to and extending downwardly from said top wall, said peripheral wall having a distal edge relative to said top wall, said distal edge resting on said top surface of said housing wherein said selected mold is positioned within said cover and surrounded by said peripheral wall, a handle being mounted on said top wall; and
    removing said cover after said bar soap becomes said fluid soap.

2. The method of molding soap into a recognizable shape according to claim 1, wherein the step of providing said housing further including a plurality of feet being attached to and extending downwardly from said bottom surface.

3. The method of molding soap into a recognizable shape according to claim 1, wherein the step of providing said housing further includes a power switch being operationally coupled to said heating unit and alternatingly turning said heating unit on or off when actuated.

4. The method of molding soap into a recognizable shape according to claim 1, further including the step of adding a coloring agent to said fluid soap and mixing said coloring agent to said fluid soap before said fluid soap cools.

5. A method of molding soap into a recognizable shape, said method comprising:
    providing a housing having a top surface, a bottom surface and a perimeter wall being attached to and extending between said top surface and said bottom surface, a plurality of feet attached to and extending downwardly from said bottom surface, each of said feet being comprised of an elastomeric material, a heating unit being mounted in said housing, said heating unit heating said top surface when said heating unit is turned on, a power switch being operationally coupled to said heating unit and alternatingly turning said heating unit on or off when actuated;
    providing a plurality of molds, each of said molds having a different shape;
    selecting one of said molds to define a selected mold;
    positioning said selected mold on said top surface such that said selected mold is in thermal communication with said heating unit;
    positioning bar soap in said selected mold;
    positioning a cover on said housing and covering said selected mold, said cover including a top wall and a peripheral wall being attached to and extending downwardly from said top wall, said peripheral wall having a distal edge relative to said top wall, said distal edge resting on said top surface of said housing wherein said selected mold is positioned within said cover and surrounded by said peripheral wall, a handle being mounted on said top wall;
    turning on said heating unit such that said bar soap becomes fluid to define fluid soap;
    removing said cover;
    adding a coloring agent to said fluid soap and mixing said coloring agent to said fluid soap;
    turning off said heating unit and allowing said fluid soap to solidify to define a molded soap; and
    removing said molded soap from said selected mold.

* * * * *